United States Patent [19]
Kawai

[11] 3,743,429
[45] July 3, 1973

[54] COLORIMETER FOR MEASURING CONCENTRATION AND INDICATING THE CONCENTRATION AS A DIGITAL QUANTITY

[75] Inventor: Shoji Kawai, Kyoto, Japan

[73] Assignees: Kabushiki Kaisha Kyoto Daiichi Kogaku, Kyoto-fu; Chugai Seiyaku Kabushiki Kaisha, Tokyo-to, Japan

[22] Filed: May 17, 1971

[21] Appl. No.: 143,901

[30] Foreign Application Priority Data
May 18, 1970  Japan.............................. 45/42294
May 18, 1970  Japan.............................. 45/42295
May 19, 1970  Japan.............................. 45/43124

[52] U.S. Cl................. 356/180, 250/218, 356/184, 356/204
[51] Int. Cl. ............................................. G01j 3/50
[58] Field of Search........................ 356/96, 97, 176, 356/177, 180–186, 188–190, 195, 201, 204–206; 250/218

[56] References Cited
UNITED STATES PATENTS
3,441,352  4/1969  Hughes............................... 356/189
3,528,749  9/1970  Bowker........................... 356/204 X
3,531,208  9/1970  Ward ................................ 356/176
3,531,209  9/1970  Williamson et al................. 356/180
3,609,047  9/1971  Marlow............................... 356/205
3,633,012  1/1972  Wilhelmson et al.............. 356/96 X FOREIGN PATENTS OR APPLICATIONS
450,576  7/1936  Great Britain...................... 356/180

OTHER PUBLICATIONS
"Biomedical Sciences Instrumentation," Volume 1, Plenum Press New York, 1964, pages 21–23 relied on.

Primary Examiner—Ronald L. Wibert
Assistant Examiner—F. L. Evans
Attorney—Steinberg & Blake

[57] ABSTRACT

A colorimeter for testing specimens such as blood samples in order to measure the concentration of a material in the specimen and indicate the concentration as a digital quantity. The specimen which is to be tested is supported at a test position, and a signal-producing structure coacts with the specimen at the test position for producing therefrom a signal indicative of the concentration of a given material in the specimen. An analog-digital transducer receives the signal and converts it into a digital quantity, the magnitude of which is indicative of the concentration. An indicator is connected to the transducer for indicating the digital quantity determined by the transducer.

11 Claims, 9 Drawing Figures

PATENTED JUL 3 1973 3,743,429

INVENTOR
SHOJI KAWAI
BY
Steinberg and Blake
ATTORNEYS

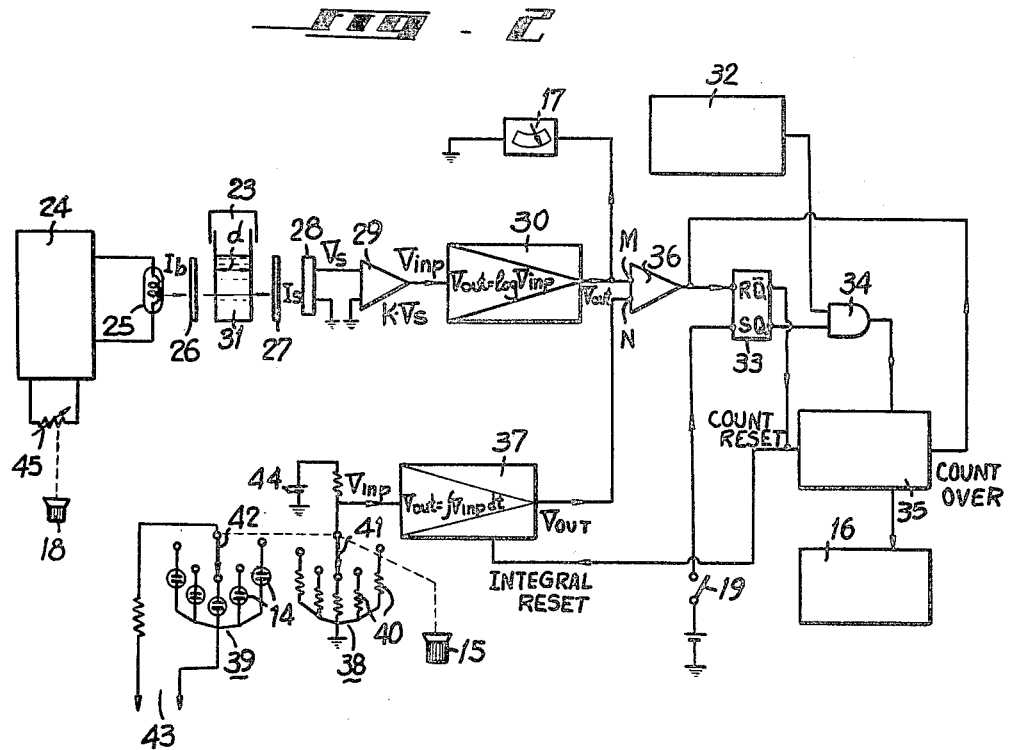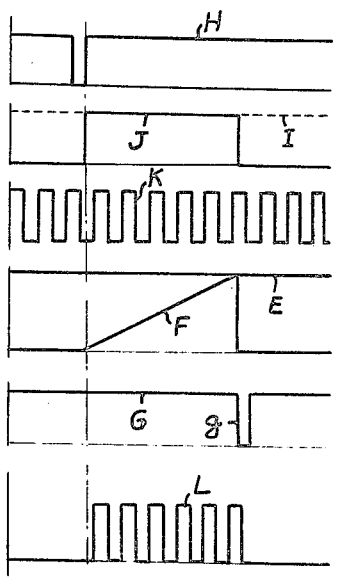

COLORIMETER FOR MEASURING CONCENTRATION AND INDICATING THE CONCENTRATION AS A DIGITAL QUANTITY

BACKGROUND OF THE INVENTION

The present invention relates to colorimeters.

Thus, the present invention relates to colorimeters where light is directed through a specimen to be received by a photocell or the like so as to produce a signal indicative of the concentration of a given material in the specimen. The present invention is particularly applicable to the use of such a colorimeter as a blood analyzer.

In recent times, clinical tests, particularly daily biochemical tests have been carried out with increasing frequency as the demand for automated clinical testing has increased. This demand has created a need for skilled technicians in the medical field, and at the present time there is a serious lack of such technicians. It is anticipated that this demand will increase as time goes on, particularly in view of the fact that there is a shortage of physicians while at the same time there has been an increasing use of diagnostic tests resulting in a requirement for screenable daily tests. As a result, there is a great need for simplification of the testing procedures and equipment, such as various instruments used for determination of blood composition. Such instruments conventionally include devices such as hemoglobinometers, bilirubinometers, and microglyceride meters. Such instruments, however, up to the present time have been used separately only in the case where urgent testing is required as an auxiliary structure for an automatic analyzer.

Quantitative analysis of various blood substances, such as, for example, hemoglobin, bilirubin and cholesterol has conventionally been carried out through observation of the development of the color of particular chromogenic reagents which are used according to the particular substance which is to be tested. With these conventional methods, the chromogenic property of the particular reagent has been given in the form of an absorption coefficient. With a conventional photoelectric colorimeter, a chart is provided with a curve indicating the relationship between the concentration and the absorption coefficient, or an absorption coefficient meter is provided with a directly readable scale, this meter being separately adjusted for each of the different reagents utilized to determine the concentration of a given material. In order to carry out operations with such conventional equipment, very exact manipulations are required and a high degree of attention on the part of the operator is required in order to eliminate the possibility of error resulting from the fact that there are a number of different materials whose concentrations are to be determined, a number of different chromogenic reagents respectively used for determining these concentrations, and a number of different charts or graphs with various curves and scales thereon, all of which requires an operator of great skill and experience in order to achieve the required results with the required precision. Thus an extremely inconvenient operation is involved with conventional colorimeters, and the operator uses these conventional procedures and equipment for quantitative analysis of many different types of materials in many different specimens, so that the occurrence of error is undesirably great in such areas as, for example, selection of the specimens which are to be tested, selection of the particular chromogenic reagents, and comparison of results with curves on graphs or scales, tables, or the like. Because of these conditions presently encountered there is a high frequency of incorrect diagnosis. A further source of error with conventional equipment results from the fact that conventional photoelectric colorimeters usually produce analog quantities indicated by meters, so that errors in reading of the values at the meters often occurs. There has therefore been an increasing demand for analysis indicating digital values, but this demand has not been satisfied up to the present time for a number of different reasons. Thus, a digital type of photoelectric colorimeter would be extremely costly and extremely difficult to adjust as a colorimeter for a control specimen. Such a digital type of photoelectric colorimeter would require a pulse generator for converting the relationship between atomic group concentration $K$ which contributes to color development and photoelectric output $I$ into an exponential function, since this relationship would otherwise be given as a logarithmic relation such as $K = \log I$.

SUMMARY OF THE INVENTION

It is accordingly a primary object of the present invention to provide a colorimeter which will avoid the above drawbacks.

In particular, it is an object of the present invention to provide a compact analyzer capable of carrying out daily biochemical tests in a simple rapid manner, enabling a plurality of specimens to be tested easily and quickly without requiring any particular skill on the part of the operator and with the possibility of carrying out these tests at any desired locations and at any desired time.

In particular it is an object of the present invention to provide a colorimeter which will not require a great deal of experience, memory, and skill on the part of the operator and which will instead utilize electromechanical and automatically operating structures to produce a quantitative analysis of high precision directly readable on a scale.

The objects of the present invention also include the provision of a photoelectric colorimeter capable of quantitatively analyzing specimens without requiring two or more colorimeters to be used.

Also it is an object of the present invention to provide a photoelectric colorimeter which will eliminate the possibility of error in the selection of a chromogenic reagent and in the reading of the analysis quantity.

The objects of the present invention also include the provision of a photoelectric colorimeter which does not require the operator to remember various factors, so that errors produced by faulty memory operations on the part of the operator can be eliminated, so that with the colorimeter of the invention the operator need not remember that a particular reagent corresponds to a particular material which is in a specimen and whose concentration is to be measured, or that a particular scale corresponds to a particular material. Instead according to the objects of the present invention the colorimeter will carry out these operations in a fully automatic manner with electromechanical structure of the invention so as to reduce in this way all possible error to an absolute minimum while at the same time providing the possibility of directly reading the desired quantitative value.

It is a further object of the present invention to provide a photoelectric colorimeter capable of indicating as a digital quantity an analog amount of the analysis value according to a meter indication.

The objects of the present invention also include the provision of a photoelectric colorimeter capable of compensating for the properties of a reagent before the material to be tested is added thereto.

Furthermore it is an object of the present invention to provide a photoelectric colorimeter having a display section for displaying to the operator the particular test which is being carried out and for automatically introducing into the circuitry factors which correspond to the particular test which is being carried out, so that the operator need not be concerned with operations of this latter type. Thus, according to the selection of a given test an electrical circuit will be influenced in a manner which corresponds to the particular test which is to be carried out.

It is also an object of the present invention to provide a colorimeter which will automatically clear the previously determined quantity from the colorimeter when it is operated to carry out a test with a new specimen.

According to the invention the colorimeter which will determine the concentration of a given material in a given specimen includes a support means for supporting a specimen in a predetermined test position. A signal-producing means is located at the region of the support means to coact with the specimen at the test position to produce therefrom a signal which is indicative of the concentration of the particular material in the specimen which is at the test position. An analog-digital transducer means is operatively connected with the signal-producing means to receive the signal therefrom and to convert the signal into a digital quantity the magnitude of which is indicative of the concentration. An indicating means is operatively connected to the transducer means for indicating the digital quantity.

BRIEF DESCRIPTION OF DRAWINGS

The invention is illustrated by way of example in the accompanying drawings which form part of this application and in which:

FIG. 3 is a graph showing a curve of the relationship between the input and output of a logarithmic transducer forming part of the colorimeter of the invention; and FIGS. 4A–4F illustrate graphically electrical signals produced by various components of the colorimeter of the invention.

DESCRIPTION OF PREFERRED EMBODIMENTS

Figure 1:
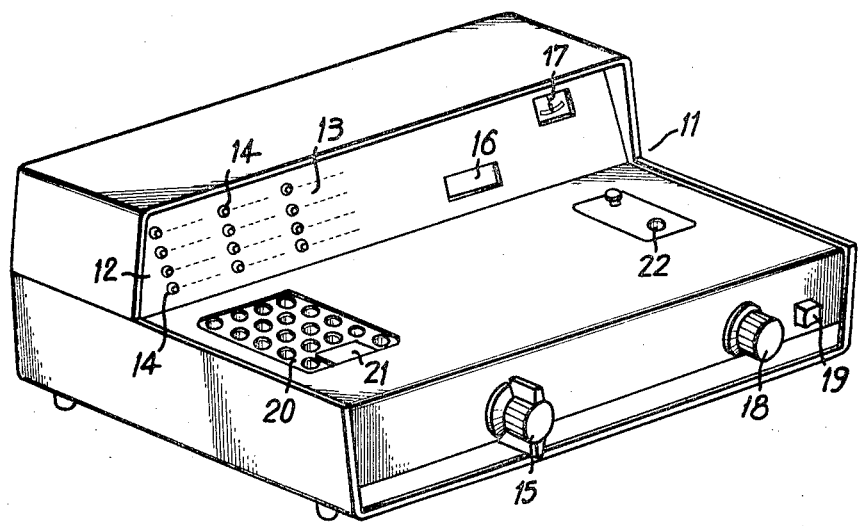
FIG. 1 is a perspective illustration of a photoelectric colorimeter according to the invention.

Referring now to FIG. 1, there is illustrated therein a housing 11 for the photoelectric colorimeter of the invention. This housing is provided with a transparent or translucent panel 12 visible from the front of the housing 11. This panel 12 forms part of a display means and has thereon at one side indicia 13 printed or otherwise situated on the panel 12 and arranged in columns which indicate the various materials the concentrations of which are to be determined. Thus, the indicia 13 will include in each of the columns names of the materials the concentration of which is to be determined. These names will be indicated on the display means together with corresponding units of concentration. For example the indicia 13 will include in the columns such designations as: HEMOGLOBIN $g/dl$, TOTAL PROTEIN $g/dl$, ALBUMIN $g/dl$, etc. Other materials to be determined in connection with blood analysis will include ZTT, TTT, blood sugar, total bilirubin, GOT, GPT, alkali phosphatase, LDH, LAP, urea nitrogen, and total cholesterol. In addition, the indicia 13 will indicate for each of the materials the chromogenic reagents to which the material is added and the particular color filter which is to be used.

Next to each of the designations which form the indicia 13 of the display means 12 there is a lamp 14 forming a display lamp and located just ahead of the particular designation. A selecting knob 15 is accessible to the operator for selecting one of the tests displayed by the display means 12,13, and through structure described below turning of the selector knob 15 will bring about illumination of a lamp 14 which is situated just ahead of the selected test.

Figure 2:
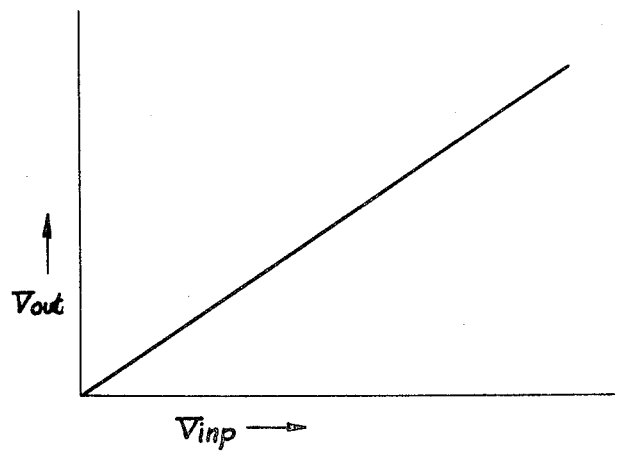
FIG. 2 is a block diagram illustrating important components of the colorimeter and the electrical connections therebetween.

An indicating means is provided for indicating the concentration as a digital quantity, and this indicating means takes the form of a fluorescent counting indicator tube visible, for example, through an opening in the panel 12 and indicating the concentration of the material in the specimen which is tested. Thus, referring to FIG. 2 there is shown therein a specimen 31 which is illustrated in FIG. 2 in a test position. This specimen 31 is located within and held by a suitable holder 23 in the form of a vial, cuvette, or the like, which is transparent and made of glass or plastic. Thus, the specimen holder 23 will initially be provided with a blank reagent, and different reagents are provided for different tests, as is well known. In order to carry out a test the material to be tested is introduced in a given quantity into the reagent initially located by itself in the specimen holder, and after suitable mixing and incubating so as to be brought to a predetermined temperature, for example, the specimen is placed in the test position and the structure of the invention will then provide through the indicating means 16 an indication of the concentration of the material added to the reagent to form the specimen 31, as a digital quantity directly indicating the concentration.

At its upper right corner, as viewed in FIG. 1, the panel 12 is provided with an opening through which may be seen the scale and pointer of a meter 17 used as part of a compensating means to compensate for the properties of the reagent before the material to be tested has been added thereto. In order to provide the required concentration, the compensating meter 17 is zeroed, and for this purpose there is available to the operator at the lower front part of the panel a rotary compensating knob 18 which the operator turns until the pointer of the meter 17 is aligned with a zero graduation on the scale of the meter 17. Thus, before the material to be tested is added to the reagent, which has been selected for the particular material, the holder 23 with only the reagent therein is situated at the test position shown in FIG. 2, and the reagent alone is tested. Any deflection of the meter 17 is zeroed by turning of the knob 18, and in this way compensation for the properties of the reagent itself is provided.

The colorimeter also includes a reset switch means 19 having a button accessible to the operator, as indicated at the lower right part of FIG. 1. The operator presses and releases this button to cause the switch means 19 first to close and then to open, and this operation will clear from the colorimeter the last-determined value appearing at the indicating means 16 and will reset the colorimeter to carry out the required test with the next specimen which has been placed at the test position. Thus, depression of the button shown at the lower right of FIG. 1 and closing of the reset switch means 19 will provide the clearing action while release of the button and opening of the switch means will initiate the operation for the next specimen. Thus, actuation of the switch means 19 will start the determination of the concentration of a given material in a given specimen, with depression of the button of the switch means clearing the value which was last determined and resetting the circuit while release of the button produces a trigger pulse which results in indication of the concentration of the material at the fluorescent counting indicator tube 16.

At the left portion of the housing 11, as viewed in FIG. 1, just in front of the panel 12 is an incubator 20 provided with a thermostat and adapted to bring about the reaction between the chromogenic reagents and the material added thereto. The thermostat of the incubator 20 will generally be set so as to bring the reagents and materials added thereto up to a temperature of 37°C. The incubator 20 is provided with a series of cavities of tubular configuration for receiving the holders 23 with the specimens 31 therein. The incubator 20 is provided with a lamp 21 which becomes illuminated when the required temperature has been reached. The incubator 20 is constructed so as to be capable of accommodating a plurality of specimen holders 23, preferably 10 or more such specimen holders.

A support means 22 is provided for supporting a specimen at the test position schematically indicated in FIG. 2. This support means 22 is formed with a single tubular guide for receiving a specimen holder 23 with the latter being held in any suitable way at the required elevation in a substantially vertical position at the test position determined by the support means 22. The several holders 23 are individually placed in the support means 22 so that each holder 23 with a specimen therein is individually tested, and after a test is completed a holder 23 with a specimen therein is removed and replaced by the next holder 23 with the specimen 31 therein. These tests are successively carried out after completion of the chromogenic reaction which takes place after the material to be tested has been added to the chromogenic reagent. Thus, the specimens to be tested will be held at the incubator 20 for a given period of time so that this chromogenic reaction will be completed before actual testing is carried out.

Referring now to FIG. 2, there is schematically represented at the upper left portion thereof a light source formed by a lamp 25 to which voltage is applied from any suitable source through an output voltage stabilizer circuit 24 acting to stabilize the voltage which is transmitted to the light source 25. Thus, the voltage stabilizer 24 functions to apply to the lamp 25 a precise voltage without any of the fluctuations which may be present in the source voltage. In this way the light source 25 will have a stabilized light output. The voltage stabilizer 24 and the light source 25 form part of a signal-producing means, and a compensating means for compensating the properties of the reagent alone is operatively connected to this signal-producing means in order to compensate for the properties of the reagent. The compensating means acts directly on the voltage stabilizer 24 by way of a variable resistor 45 which is adjusted by turning of the knob 18. The light which issues from the light source 25 passes through the specimen 31 and is received by a photosensitive means 28 of the signal-producing means. By connecting the compensating structure 45,18 to the voltage stabilizer a compensation may be carried out for the particular properties of the reagent without varying the degree of amplification of the preamplifier 29.

The signal-producing means further includes a heat filter 26 located between the lamp 25 and the specimen. This filter 26 will absorb heat rays before they reach the specimen holder 23 so as to prevent a photosensitive means 28 of the signal-producing means from becoming overheated.

Between the specimen holder 23 and the photosensitive means 28 is a color filter 27 selected in accordance with designations at the display means 12,13 as pointed out above. The filter 27 is selected in accordance with the properties of the reagent. Thus a number of these color filters are located on any suitable support enabling a selected filter 27 to be situated in the path of travel of light from the source 25 through the specimen. The particular filter 27 which is used in any given case has a wave length corresponding to the absorption properties of the particular chromogenic reagent to which the material to be tested has been added.

The photosensitive means 28 may be in the form of a suitable photocell, for example, and the light impinging thereon is converted thereby into an electrical signal $Vs$ the magnitude of which corresponds to the intensity of the light received by the photosensitive means 28. This output signal $Vs$ from the photosensitive means 28 is transmitted to the preamplifier 29 of the signal-producing means. The output signal $Vs$ is amplified by the preamplifier 29 by a proportional constant $K$, so that the output signal from the preamplifier 29 is in the form of $(K \cdot Vs)$. In addition to the components 24 – 29, the signal-producing means includes a logarithmic transducer 30 which receives the exponential output electrical signal $(K \cdot Vs)$ as an input electrical signal $(Vinp)$, and this input signal is converted by the logarithmic transducer into a linear output electrical signal $(Vout)$.

The logarithmic transducer 30 of the signal-producing means has predetermined characteristics. Thus, when light rays of light intensity $I_o$ radiating from the light source 25 pass through the specimen 31 in a holder 23 and reach the photosensitive means 28, the light rays are partially absorbed by the specimen 31 and the initial light intensity $I_o$ is reduced to a lesser light intensity $I_s$. Thus, the light intensity $I_o$ will be greater than the light intensity $I_s$. If this reduction in light intensity is in accordance with the Lamert-Beer's Law, the relation $$I_s = I_o e^{-a \cdot c \cdot d}$$

(1)

is satisfied. In this relation (1), $I_o$ represents the light intensity of the light rays issuing from the light source 25, $I_s$ represents the light intensity of the light rays reaching the photocell 28, $c$ represents the concentration which is to be determined, $d$ represents the thickness of the specimen, or in other words the thickness of the holder 23, as indicated in FIG.2 and $a$ represents the absorption constant of the chromogenic reagent in a particular test.

The above relation (1) may be transformed into the relation $$\log (I_s/I_o) = - a \cdot c \cdot d \quad (2)$$

The concentration $c$ of the material, which is the value which is to be determined, is obtained by dividing a determination value of $(- a \cdot c \cdot d)$ by the absorption constant $a$. In accordance with the invention the logarithmic transducer 30 has input and output characteristics according to which $Vout = \log Vinp$, in order to obtain the value $(-a \cdot c \cdot d)$ or in other words $\log I_s/I_o$.

This relationship is illustrated graphically in FIG.3. The particular logarithmic transducer 30 which is used is constructed in such a way that the linear output signal ($Vout$) thereof is zero when the amplified output electrical signal ($K \cdot Vs$) is supplied to the logarithmic transducer 30 as the input electrical signal ($Vinp$) · $Vout = Ve$ when the input electrical signal $Vinp = K \cdot Vs/10$, whereas $Vout = 2Ve$ when there is transmitted to the transducer 30 from the preamplifier 29 an input electrical signal $Vinp = K \cdot Vs/100$.

The absorption constant $a$ varies depending upon the composition of the particular chromogenic reagent which is used in a particular test. This variation is compensated by the structure of the analog-digital transducer means of the invention. This latter means includes a non-stable multivibrator 32, a bistable multivibrator 33, an AND gate circuit 34, a decimal counter 35, a comparator 36, and an integrator 37. These components operate in such a way that the conversion sensitivity of this analog-digital transducer means may be varied by variation of the input electric signal ($V_{INP}$) supplied to the integrator 37.

This latter input signal is varied by introducing into the voltage input to the integrator 37 a resistor of a selected size. Referring to FIG.2 it will be seen that there are a group 38 of resistors 40 capable of being individually selected for introduction into the voltage input of the integrator 37 so that in accordance with the magnitude of the selected resistor 40 the variation of the conversion sensitivity of the analog-digital transducer means may be brought about. The several lamps 14 of the display means form a group 39 of lamps as schematically represented in FIG.2. As was indicated above, the rotary knob 15 is turned so as to select one of the lamps 14 for illumination, the selected display lamp 14 being situated just ahead of the selected test of the indicia 13 on the panel 12 of the display means. With the construction schematically shown in FIG.2, when a particular lamp 14 is selected for illumination, one of the several resistors 40 is also selected to be placed into the circuit of the voltage input into the integrator 37. The particular resistor 40 which is selected is equivalent to the absorption constant $a$ of the particular chromogenic reagent which is selected in accordance with the indicia 13 at the display means. Thus in accordance with the particular selection which is made there is an automatic variation of the input electrical signal ($V_{INP}$) which is applied to the integrator 37 so as to bring about compensation for the absorption constant $a$.

As is schematically represented at the lower left part of FIG. 2, rotation of the knob 15 will swing a pair of switch blades 41 and 42 respectively around predetermined axes successively stepping the switch blades 41 and 42 from one to the next of a pair of series of contacts which are respectively connected with the lamps 14 and the resistors 40. Thus, whenever a particular lamp 14 is illuminated a corresponding resistor 40 will be placed in the circuit of the input to the integrator 37. Thus, through this automatic introduction of the particular resistor 40 into the voltage input supplied to the integrator 37 there is an automatic substantial compensation for the absorption constant $a$ of the particular chromogenic reagent which is used in the particular test. The group of lamps 39 are connected by conductors 43 to any suitable electrical source such as a commercial power source serving to energize the selected lamp 14 of the group 39 so as to display the selection at the display means. A power source 44 is provided for the input electrical signal which is supplied to the integrator 37.

As was pointed out above, a compensating means is provided to compensate for the properties of the reagent, and this compensating means includes the knob 18 and the variable resistor 45 which is connected to the voltage stabilizer 24. The meter 17 which is zeroed as described above is electrically connected to the output of the logarithmic transducer 30 so that the meter 17 directly responds to the signal which is produced by the signal-producing means 24–30. The knob 18 is turned to adjust the variable resistor 45 so that through the stabilizer 24 the meter 17 is zeroed, as pointed out above, and in this way the compensating means 17,18,45 serves to compensate the signal produced by the signal-producing means 24–30 for the properties of the chromogenic reagent. It is of course to be noted that this compensating means 17,18,45 is operated when a holder 23 with only chromogenic reagent therein is placed by the support means 22 in the test position. It is at this time that the meter 17 is zeroed. Thereafter the material which is to be tested is added to the chromogenic reagent. Thus, the compensating means 17,18,45 compensates the signal produced by the signal-producing means 24–30 while selection of one of the resistors 40 compensates the signal put out by the integrator 37, and both of these compensations will effectively compensate for the properties of the particular chromogenic reagent which is used.

Thus, by way of the compensating means 17,18,45, the signal put out by the signal-producing means with respect to the chromogenic reagent alone is reduced to zero. When the reagent alone is exposed to the light issuing from the source 25, this reagent may be initially somewhat colored, before the material to be tested is mixed therewith. Thus it may well be that due to the properties of the chromogenic reagent itself the output signal ($Vout$) from the logarithmic transducer 30 is not zero, and thus in many cases the pointer of the meter 17 will be deflected away from the zero graduation. Under these conditions it is not possible to achieve readings of the required precision unless this pointer of the meter 17 is first returned back to the zero graduation, as is brought about by turning of the knob 18 to adjust the variable resistor 45, as pointed out above. In this way an adjustment is made of the light which issues from the source 25 in order to compensate for the properties of the chromogenic reagent. Thus, when this compensation is carried out the output signal $Vs$ provided by the photosensitive means 28 in the presence of the chromogenic reagent alone will be zero. Thus, adjustment of the signal ($Vs$) to zero will also adjust the linear photoelectrical signal ($Vout$) to zero, bringing the pointer of the meter 17 to the zero graduation. In this way a deflection due to the properties of the chromogenic reagent is effectively compensated.

The analog-digital transducer means 32–37 also includes the comparator 36 which has two input terminals M and N, the terminal M being electrically connected to the output of the logarithmic transducer 30 so as to receive the signal from the signal-producing means 24–30. The terminal N of the comparator 36 is connected to the output side of the integrator 37 so as to receive a signal therefrom. The output electrical signal from the comparator 36 is zero when the input electrical signal from the logarithmic transducer 30 is equal to or higher than the signal received by the comparator 36 from the integrator 37, and the bistable multivibrator 33 of the analog-digital transducer means is reset when the input electrical signal from the logarithmic transducer 30 is lower than the signal from the integrator 37, this bistable multivibrator 33 being connected to the comparator 36 to receive a signal therefrom at the terminal R.

Referring to FIG. 4D, the signal E illustrated therein corresponds to the linear output electrical signal ($Vout$) put out by the logarithmic transducer 30 and received at the input terminal M of the comparator 36. The signal F which is illustrated in FIG. 4D represents the output signal ($V_{OUT}$) put out by the integrator 37 and received at the input terminal N of the comparator 36. The integrator 37 integrates the input signal ($V_{INP}$) upon disappearance of a reset pulse signal from the bistable multivibrator 33 which is connected to the output side of the comparator 36, and this integrating operation continues until the output signal ($V_{OUT}$) from the integrator 37 corresponds to the linear output signal E or ($Vout$) from the logarithmic transducer 30. During this integrating operation the AND gate circuit 34 remains open.

FIG. 4E illustrates the output electrical signal G corresponding to the comparator output signal put out by the comparator 36. The signal g shown in FIG. 4E corresponds to the reset pulse signal of the bistable multivibrator 33.

FIG. 4A illustrates the signal H corresponding to the trigger pulse which is applied to a set terminal S of the bistable multivibrator 33 upon operation of the reset switch means 19. Application of this trigger pulse maintains an output condition at the bistable multivibrator 33 until the decimal counter 35 applies a count over signal to the reset terminal R.

Referring to FIG. 4B, the signal I corresponds to the output signal from a terminal $\overline{Q}$ of the bistable multivibrator 33, and the signal J illustrated in FIG. 4B corresponds to the output signal applied from the terminal Q to the AND gate circuit 34. This AND gate circuit 34 is opened by the output signal J.

The signal K illustrated in FIG. 4C corresponds to the output electrical signal transmitted from the non-stable multivibrator 32 to the AND gate circuit 34, and the frequency of the pulses of the signal K depends upon the circuit constant.

Referring to FIG. 4F, the output electrical signal L illustrated therein corresponds to the output electrical signal which has passed through the open AND gate circuit 34, and the number of pulses of the signal L is indicated by the indicating means formed by the fluorescence counting indicator tube 16 by way of digits 0–9 according to the counting carried out by the decimal counter 35.

Considering the operation of the analog-digital transducer means 32–37 in greater detail, the trigger pulse H illustrated in FIG. 4A is applied to the set terminal S of the bistable multivibrator 33 upon depression of the button of the switch means 19 shown at the lower right of FIG. 1 and release thereof, with the result that the output electrical signal J shown in FIG. 4B is generated by the terminal Q of the bistable multivibrator 33, and thus the AND gate circuit is opened in response to this signal J. On the other hand, the output electrical signal K illustrated in FIG. 4C is supplied by the nonstable multivibrator 32 to the AND gate circuit 34, and this output electrical signal K passes through the AND gate circuit 34 as the output electrical signal L illustrated in FIG. 4F, the pulses of which are counted by the decimal counter 35 until the AND gate circuit 34 is closed. In the meantime, the logarithmic transducer 30 of the signal-producing means provides the output electrical signal E illustrated in FIG. 4D, this being the signal ($Vout$), while the integrator 37 simultaneously provides the output electrical signal F shown in FIG. 4D, representing the output signal ($V_{OUT}$). The closing of the AND gate circuit 34 takes place at the instant when the output electrical signals E and F intersect. Thus, the integrator 37 integrates the input electrical signal ($V_{INP}$) from the instant when the reset pulse signal from the bistable multivibrator 33 disappears and the AND gate circuit 34 remains opened until the output electrical signal ($V_{OUT}$) of the integrator 37 equals the linear output electrical signal ($Vout$) from the logarithmic transducer 30, so that the number of pulses of the signal L is counted by the decimal counter 35 and thus the concentration of the material in the specimen is converted from an analog amount to a digital quantity for convenient reading.

In order to use the photoelectric colorimeter of the invention, a main power source switch, which is not illustrated, is closed. The incubator 20 is then heated and automatically reaches the temperature of 37°C. The separate specimen holders 23 initially have the chromogenic reagent therein, and a predetermined quantity of a material to be tested is added to the proper chromogenic reagent. The holders 23 with the specimens 31 therein are then inserted into the incubator 20 so as to provide a predetermined period during which the reaction takes place. When the knob 15 is turned to change the previous selection to the new selection according to the test which is to be carried out, one of the resistors 40 of the group 38 is selected to be placed into the input voltage circuit supplied to the integrator 37, and simultaneously a lamp 14 corresponding to the selection which is made is illuminated, as described above. Thus a resistor 40 corresponding to the absorption constant $a$ of the selected chromogenic reagent is introduced into the voltage input of the integrator 37.

Of course, prior to adding the material to be tested to the proper chromogenic reagent, the holder 23 with the reagent alone therein is placed in the test position 22 and the meter 17 is zeroed so as to provide for the compensation of the properties of the chromogenic reagent, as pointed out above. In this way the amount of light issuing from the source 25 is adjusted by operating the knob 18 until the pointer of the meter 17 is aligned with the zero graduation thereof. After this compensation has been carried out and the material to be tested has been added to the chromogenic reagent and treated in the incubator 20 for the required period, the specimen which is to be tested is removed from the incubator 20 and placed at the test position determined by the support means 22. Now light rays of intensity $Io$ issuing from the source 25 pass through the specimen 31 and reach the photoelectric cell 28 with a reduced light intensity $Is$. This photosensitive means 28 converts the light rays of the light intensity $Is$ to the output electrical signal ($Vs$) which is amplified K times by the preamplifier 29, thus forming the signal which is transmitted to the logarithmic transducer 30 as its input electrical signal ($V$inp). This exponential input electrical signal ($V$inp) is converted by the logarithmic transducer 30 into the linear output electrical signal ($V$out), which forms the input electrical signal to the comparator 36. At the same time the integrator 37 provides the output electrical signal ($V_{OUT}$).

When the testing of one specimen has been completed, the next specimen is placed by the support means 22 in the test position, and then the reset switch means 19 is actuated. The operator will depress and release the button shown at the lower right of FIG. 1. The result is that the last-determined value is cleared and the circuit is reset while a trigger pulse H is delivered to the bistable multivibrator 33. As a result the bistable multivibrator 33 generates the output electrical signal J which is delivered to the AND gate circuit 34, and the AND gate circuit 34 is thus opened.

Meanwhile, the output electrical signal K generated by the non-stable multivibrator 32 is delivered to the AND gate circuit 34, and this electrical signal K passes through the gate circuit, forming the output electrical signal L, and this latter signal will continue until the instant when the AND gate circuit 34 is closed. The number of the pulses of the signal L is counted by the decimal counter 35 and indicated by the indicating means formed by the fluorescence counting indicator tube 16 as a digital quantity. The AND gate circuit 34 closes at the instant when the output electrical signal E from the logarithmic transducer 30 is intersected by the output electrical signal F from the integrator 37. Thus it is possible to indicate the concentration of the material in the specimen 31 of each specimen holder 23 as a digital quantity through a simple and convenient operation.

Although the invention has been described above in connection with a preferred embodiment thereof, it is clear that certain modifications are possible with respect to particular applications of the invention so that the preferred embodiment thereof shown in the drawings and described above is to be understood as being only by way of example.

What is claimed is:

1. In a colorimeter for determining the concentration of a given material in a given specimen, support means for supporting a specimen in a test position, signal-producing means located at the region of said support means for coacting with a specimen at said test position to produce therefrom a signal which is indicative of the concentration of a given material in the specimen at said test position, analog-digital transducer means operatively connected with said signal-producing means for receiving a signal therefrom and for converting said signal into a digital quantity the magnitude of which is indicative of said concentration, and indicating means operatively connected with said transducer means for indicating said digital quantity, said analog-digital transducer means including a comparator connected electrically to said signal-producing means for receiving a signal therefrom and an integrator connected electrically to said comparator for transmitting thereto a signal to be compared with the signal produced by said signal-producing means, said transducer means converting said signal from said signal-producing means into said digital quantity when the signal from said integrator equals the signal from said signal-producing means.

2. The combination of claim 1 and wherein a reset switch means is operatively connected with said transducer means for clearing the last-determined digital quantity therefrom and for resetting said transducer means to determine the next digital quantity when a new specimen has been placed at said test position.

3. The combination of claim 1 and wherein an incubator means is located adjacent said support means for bringing a specimen to a predetermined temperature before the specimen is situated at said test position.

4. The combination of claim 1 and wherein said transducer means also includes a bistable multivibrator connected to said comparator to receive the output thereof and a reset switch means electrically connected with said bistable multivibrator for clearing the last-determined digital quantity from said transducer means and for resetting the latter to determine the next digital quantity when a new specimen has been placed at said test position.

5. The combination of claim 4 and wherein said transducer means further includes an AND gate circuit and a decimal counter both connected electrically with said bistable multivibrator, said decimal counter also being electrically connected with said integrator for resetting the latter in response to operation of said reset switch means, and a non-stable multivibrator electrically connected with said AND gate circuit for transmitting through the latter to said decimal counter a signal having pulses of predetermined frequency, the number of the latter pulses being counted by said decimal counter until the signal from said integrator equals the signal from said signal-producing means, the latter signals being compared by said comparator.

6. The combination of claim 5 and wherein said indicating means includes a fluorescent counting indicator tube electrically connected to said decimal counter to be operated thereby and indicating the concentration as an absolute value.

7. The combination of claim 1 and wherein said signal-producing means includes a light source for directing light through a specimen at said test position, photosensitive means for receiving the light and converting the latter into a predetermined signal, a pre-amplifier for receiving the latter signal from said photosensitive means and amplifying the signal, and a logarithmic transducer electrically connected to said pre-amplifier for receiving an exponential output electrical signal therefrom and for converting the latter to a linear output signal which is transmitted to said analog-digital transducer means.

8. The combination of claim 7 and wherein a heat filter is located between said light source and test position and a color filter is located between said test position and photosensitive means, so that the heat filter acts on the light before it reaches the specimen while the color filter coacts with light which has passed through the specimen to compensate for properties of the reagent thereof.

9. In a colorimeter for determining the concentration of a given material in a given specimen, support means for supporting a specimen in a test position, signal-producing means located at the region of said support means for co-acting with a specimen at said test position to produce therefrom a signal which is indicative of the concentration of a given material in the specimen at said test position, analog-digital transducer means operatively connected with said signal-producing means for receiving a signal therefrom and for converting said signal into a digital quantity the magnitude of which is indicative of said concentration, and indicating means operatively connected with said transducer means for indicating said digital quantity, a compensating means operatively connected with said signal-producing means for influencing the latter to provide a signal which is compensated for the properties of a reagent of the specimen, said compensating means including a meter operatively connected to said signal-producing means for receiving the signal produced thereby and transmitted to said transducer means, said meter indicating the magnitude of said signal as produced by the reagent alone, and said compensating means including an adjusting means operatively connected to said signal-producing means for adjusting the latter to zero the meter so as to compensate for the properties of the reagent.

10. The combination of claim 9 and wherein said signal-producing means includes a light source for directing light through a specimen at said test position, a voltage stabilizer operatively connected to said light source for stabilizing the voltage transmitted thereto, and said adjusting means including a variable resistor operatively connected to said voltage stabilizer for adjusting the latter to zero said meter to compensate for the properties of the reagent.

11. In a colorimeter for determining the concentration of a given material in a given specimen, support means for supporting a specimen in a test position, signal-producing means located at the region of said support means for coacting with a specimen at said test position to produce therefrom a signal which is indicative of the concentration of a given material in the specimen at said test position, analog-digital transducer means operatively connected with said signal-producing means for receiving a signal therefrom and for converting said signal into a digital quantity the magnitude of which is indicative of said concentration, and indicating means operatively connected with said transducer means for indicating said digital quantity, a manually operable selecting means operatively connected with said transducer means for selecting one of a plurality of different tests to be carried out, and display means operatively connected with said selecting means for displaying the selected test, said transducer means including an integrator and a comparator connected electrically to said integrator for receiving a signal therefrom, said comparator also being connected electrically to said signal-producing means for receiving a signal from the latter to compare the latter signal with the signal received from said integrator, and said selecting means including a plurality of resistors respectively corresponding to absorption constants of different reagents, said selecting means placing in the voltage input to said integrator that one of said resistors which corresponds to the absorption constant of the reagent in the specimen which is to be tested.

* * * * *